United States Patent
Lee et al.

(10) Patent No.: US 9,876,363 B2
(45) Date of Patent: Jan. 23, 2018

(54) NON-CONTACT TYPE POWER TRANSMITTING APPARATUS, NON-CONTACT TYPE POWER TRANSMITTING-RECEIVING APPARATUS, CONTACT/NON-CONTACT TYPE POWER TRANSMITTING APPARATUS, AND CONTACT/NON-CONTACT TYPE POWER TRANSMITTING-RECEIVING APPARATUS

(71) Applicant: Samsung Electro-Mechanics Co., Ltd., Suwon-Si (KR)

(72) Inventors: Young Min Lee, Suwon-Si (KR); Tae Won Heo, Suwon-Si (KR); Sang Ho Cho, Suwon-Si (KR); Heung Gyoon Choi, Suwon-Si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 398 days.

(21) Appl. No.: 14/636,823

(22) Filed: Mar. 3, 2015

(65) Prior Publication Data
US 2016/0079763 A1 Mar. 17, 2016

(30) Foreign Application Priority Data
Sep. 11, 2014 (KR) ........................ 10-2014-0120451

(51) Int. Cl.
| | |
|---|---|
| *H01F 37/00* | (2006.01) |
| *H02J 5/00* | (2016.01) |
| *H01F 38/14* | (2006.01) |
| *H02J 50/10* | (2016.01) |
| *H02J 50/80* | (2016.01) |
| *H02J 7/02* | (2016.01) |

(52) U.S. Cl.
CPC .............. *H02J 5/005* (2013.01); *H01F 38/14* (2013.01); *H02J 50/10* (2016.02); *H02J 50/80* (2016.02); *H02J 7/025* (2013.01)

(58) Field of Classification Search
None
See application file for complete search history.

(56) References Cited

U.S. PATENT DOCUMENTS

| | | | |
|---|---|---|---|
| 2002/0110013 A1* | 8/2002 | Park ................... | H01F 27/2804 363/153 |
| 2008/0157909 A1* | 7/2008 | Chen ................. | H02M 3/33523 336/105 |
| 2013/0113421 A1 | 5/2013 | Han et al. | |
| 2013/0127405 A1 | 5/2013 | Scherer et al. | |
| 2014/0239736 A1* | 8/2014 | Kai ....................... | B60L 11/182 307/104 |

FOREIGN PATENT DOCUMENTS

| | | |
|---|---|---|
| JP | 2013-110915 A | 6/2013 |
| KR | 10-2013-0048982 A | 5/2013 |
| KR | 10-2013-0054897 A | 5/2013 |

* cited by examiner

*Primary Examiner* — Long Nguyen
(74) *Attorney, Agent, or Firm* — NSIP Law

(57) ABSTRACT

A non-contact type power transmitting apparatus may include a rectifying unit rectifying alternating current (AC) power, a power converting unit converting the power rectified by the rectifying unit into direct current (DC) power through a single power converting operation and switching and transmitting the DC power, and a power transmitting coil transmitting transmission power transmitted from the power converting unit externally in a non-contact scheme.

7 Claims, 3 Drawing Sheets

NON-CONTACT TYPE POWER
TRANSMITTING APPARATUS,
NON-CONTACT TYPE POWER
TRANSMITTING-RECEIVING APPARATUS,
CONTACT/NON-CONTACT TYPE POWER
TRANSMITTING APPARATUS, AND
CONTACT/NON-CONTACT TYPE POWER
TRANSMITTING-RECEIVING APPARATUS

CROSS-REFERENCE TO RELATED
APPLICATION

This application claims the priority and benefit of Korean Patent Application No. 10-2014-0120451, filed on Sep. 11, 2014, with the Korean Intellectual Property Office, the disclosure of which is incorporated in its entirety herein by reference.

BACKGROUND

Some embodiments of the present disclosure may relate to a non-contact type power transmitting apparatus, a non-contact type power transmitting-receiving apparatus, a contact/non-contact type power transmitting apparatus, and a contact/non-contact type power transmitting-receiving apparatus capable of transmitting power in a non-contact scheme.

In order for an electric/electronic apparatus to receive externally-available power, a power supply apparatus for transferring power from an external power supply facility to the electric/electronic apparatus may be needed.

A wired type power supply apparatus directly connected to the electronic apparatus by a connector, or the like, to supply power to a battery embedded in the electronic apparatus is generally used. Alternatively, power may be supplied to a battery embedded in the electronic apparatus in a non-contact scheme by a magnetic induction effect or by a magnetic resonance effect as in the following Related Art Document (Patent Document).

RELATED ART DOCUMENT (Patent Document 1) Korean Patent Laid-Open Publication No. 10-2013-0054897

SUMMARY

Some embodiments of the present disclosure may provide a non-contact type power transmitting apparatus, a non-contact type power transmitting-receiving apparatus, a contact/non-contact type power transmitting apparatus, and a contact/non-contact type power transmitting-receiving apparatus in which a power converting operation may be simplified.

According to an aspect of the present disclosure, a non-contact type power transmitting apparatus may include: a rectifying unit rectifying alternating current (AC) power; a power converting unit converting the power rectified by the rectifying unit into direct current (DC) power through a single power converting operation and switching and transmitting the DC power; and a power transmitting coil transmitting transmission power transmitted from the power converting unit externally therefrom in a non-contact scheme. The non-contact type power transmitting-receiving apparatus may include: the non-contact type power transmitting apparatus; and a power receiving apparatus including a power receiving coil receiving the power transmitted from the power transmitting coil in the non-contact scheme and a power charging unit converting the power from the power receiving coil into charging power and charging a battery with the charging power.

The power charging unit may include at least one of a buck converter and a boost converter varying a voltage level of the power from the power receiving coil. The power receiving apparatus may include a bidirectional converter bidirectionally transferring power between the battery and an external electronic device through an input/output interface unit in a contact scheme. The bidirectional converter may transfer power charged in the battery to the external electronic device when a voltage level of the power charged in the battery is higher than that of power of the external electronic device, and transfer the power from the external electronic device to the battery when the voltage level of the power of the external electronic device is higher than that of the power charged in the battery.

According to another aspect of the present disclosure, a power transmitting apparatus may include: a transformer having a power transmitting coil transmitting transmission power from a power converting unit externally therefrom in a non-contact scheme and an auxiliary coil magnetically coupled to the power transmitting coil to transfer power converted depending on a turns ratio to the power transmitting coil externally therefrom in a contact scheme.

The power transmitting apparatus may further include a bidirectional converter transferring power in two directions including one direction in which power induced from the power transmitting coil to the auxiliary coil is transferred to an external electronic device through an input/output interface unit and the other direction in which power from the external electronic device is transmitted to the power receiving coil through the auxiliary coil in the non-contact scheme. The bidirectional converter may transfer the power from the auxiliary coil to the external electronic device through the input/output interface unit when the power is induced from the power transmitting coil to the auxiliary coil, and transmit the power of the external electronic device to the power receiving coil through the auxiliary coil in the non-contact scheme when the induction of the power from the power transmitting coil to the auxiliary coil stops.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Figure 1:
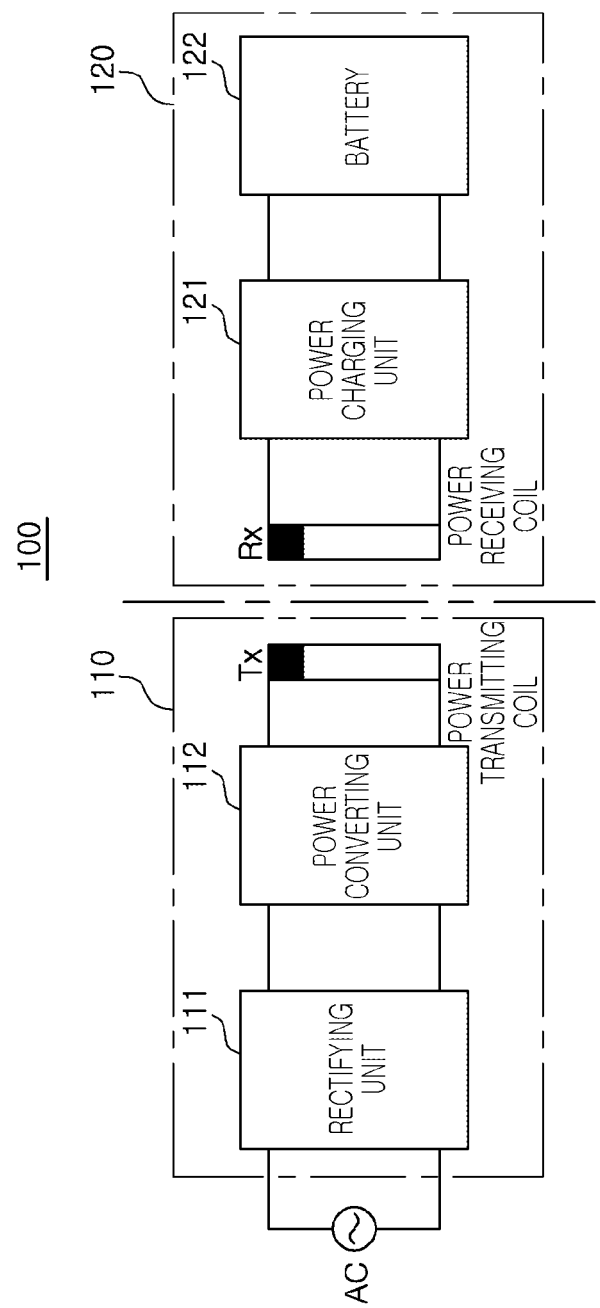
FIG. 1 is a view illustrating a schematic configuration of a non-contact type power transmitting-receiving apparatus according to an exemplary embodiment in the present disclosure.

Hereinafter, embodiments in the present disclosure will be described in detail with reference to the accompanying drawings.

The disclosure may, however, be embodied in many different forms and should not be construed as being limited to the embodiments set forth herein. Rather, these embodiments are provided so that this disclosure will be thorough and complete, and will fully convey the scope of the disclosure to those skilled in the art.

Throughout the drawings, the same or like reference numerals will be used to designate the same or like elements.

FIG. 1 is a view illustrating a schematic configuration of a non-contact type power transmitting-receiving apparatus according to an exemplary embodiment in the present disclosure.

Referring to FIG. 1, a non-contact type power transmitting-receiving apparatus 100 according to an exemplary embodiment in the present disclosure may include a power transmitting apparatus 110 and a power receiving apparatus 120.

Transmission power may be transferred from the power transmitting apparatus 110 to the power receiving apparatus 120 in a non-contact scheme.

Here, the non-contact scheme may mean, for example, but not limited to, a scheme of transmitting power without using conductors in a process of transmitting the power from a transmit side to a receive side and may be called a contactless scheme, a wireless transmitting scheme, or the like.

First, the power transmitting apparatus 110 may include a rectifying unit 111, a power converting unit 112, a power transmitting coil Tx.

The rectifying unit 111 may rectify input alternating current (AC) power.

The rectifying unit 111 may full-wave-rectify or half-wave-rectify the input AC power. For instance, the rectifying unit 111 may include at least two diodes (not shown) or a bridge diode (not shown) in order to perform the above-mentioned rectifying operation.

The power converting unit 112 may convert the power rectified by the rectifying unit 111 into direct current (DC) power through a single power converting operation, switch the converted DC power, and transmit the switched power externally therefrom through the power transmitting coil Tx in the non-contact scheme.

As described above, since the power transmitting apparatus 110 may perform an AC/DC single power converting operation in the power converting unit 112, a separate DC/DC power converting circuit may not be used, such that power converting efficiency may be increased.

The power transmitting coil Tx may be connected to the power converting unit 112 to transmit the transmission power switched by the power converting unit 112 externally therefrom in the non-contact scheme.

To this end, the power transmitting coil Tx may be formed of a conductor having a preset turns amount, and may have a shape similar to that of an antenna to transmit the power in the non-contact scheme, but is not limited thereto.

The power receiving apparatus 120 may include a power receiving coil Rx, a power charging unit 121, and a battery 122.

For instance, when considering that the power is transmitted between the power transmitting apparatus 110 and the power receiving apparatus 120 in the non-contact scheme, the power transmitting apparatus 110 may be a contactless or non-contact type power charging apparatus, and the power receiving apparatus 120 may be a mobile device such as a cellular phone, a smartphone, or the like, or an electronic device such as a television, a monitor, or the like, charged with the power received from the power charging apparatus in the contactless scheme or the non-contact scheme.

The power receiving coil Rx of the power receiving apparatus 120 may receive the power transmitted from the power transmitting coil Tx in the non-contact scheme. The power charging unit 121 of the power receiving apparatus 120 may convert the power received in the power receiving coil Rx into charging power and may charge the charging power in the battery 122.

To this end, although not shown, the power charging unit 121 may include a boost converter increasing a voltage level of the power received in the power receiving coil Rx or a buck converter decreasing a voltage level of the power received in the power receiving coil Rx.

Figure 2:
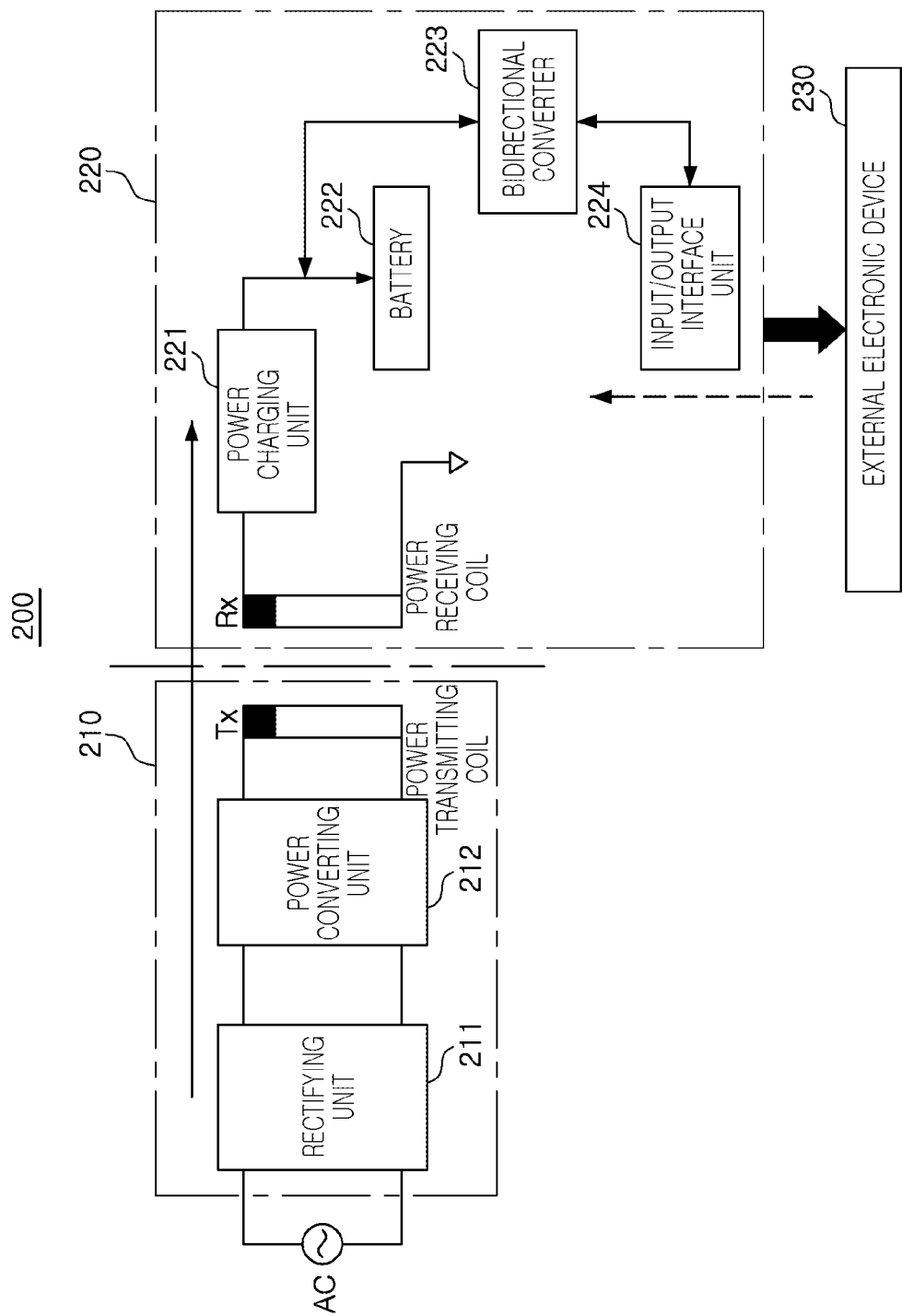
FIG. 2 is a view illustrating a schematic configuration of a contact/non-contact type power transmitting-receiving apparatus according to an exemplary embodiment in the present disclosure.

FIG. 2 is a view illustrating a schematic configuration of a contact/non-contact type power transmitting-receiving apparatus according to an exemplary embodiment in the present disclosure.

Referring to FIG. 2, a contact/non-contact type power transmitting-receiving apparatus 200 according to an exemplary embodiment in the present disclosure may include a power transmitting apparatus 210 and a power receiving apparatus 220.

The power transmitting apparatus 210 illustrated in FIG. 2 may include a rectifying unit 211, a power converting unit 212, and a power transmitting coil Tx, similar to the power transmitting apparatus 110 illustrated in FIG. 1.

Similar to the descriptions provided with reference to FIG. 1, the rectifying unit 211 may rectify input AC power, and the power converting unit 212 may convert the power rectified by the rectifying unit 211 into DC power.

The power converting unit 212 may switch the converted DC power and transmit the power externally therefrom through the power transmitting coil Tx in the non-contact scheme.

The power receiving apparatus 220 may include a power receiving coil Rx, a power charging unit 221, and a battery 222, similar to the power receiving apparatus 120 illustrated in FIG. 1. In addition, the power receiving apparatus 220 may further include a bidirectional converter 223 and an input/output interface unit 224, as illustrated in FIG. 2.

Similar to the descriptions provided with reference to FIG. 1, the power receiving coil Rx may receive the power transmitted from the power transmitting coil Tx in the non-contact scheme, and the power charging unit 221 may convert the power received in the power receiving coil Rx into charging power and may charge the battery 222 with the charging power.

In addition, although not shown, the power charging unit 221 may include a boost converter increasing a voltage level of the power from the power receiving coil Rx or a buck converter decreasing a voltage level of the power from the power receiving coil Rx.

As described above, the power receiving apparatus 220 illustrated in FIG. 2 may include the bidirectional converter 223 and the input/output interface unit 224, wherein the bidirectional converter 223 may bidirectionally transfer power between the battery 222 and an external electronic device 230 through the input/output interface unit 224 in a contact scheme.

Here, the contact scheme may mean, for instance, but not limited to, a scheme of transmitting power through conductors in a process of transmitting the power from a transmit side to a receive side, or a scheme of transmitting the power by connecting the transmit side and the receive side to each other in a wired form or electrically connecting the transmit side and the receive side to each other by a contact between a terminal provided in the transmit side and a terminal provided in the receive side.

The bidirectional converter 223 may change a direction in which the power is transferred depending on a voltage difference between a voltage level of the power charged in the battery 222 and a voltage level of power of the external electronic device 230.

For example, the bidirectional converter 223 may transfer the power charged in the battery 222 to the external electronic device 230 when the voltage level of the power charged in the battery 222 is higher than that of the power of the external electronic device 230, and may transfer the power from the external electronic device 230 to the battery 222 when the voltage level of the power of the external electronic device 230 is higher than that of the power charged in the battery 222.

The external electronic device 230 may be a mobile device such as a cellular phone, a smartphone, or the like, or an electronic device such as a television, a monitor, or the like, similar to the power receiving apparatus 220.

As described above, the contact/non-contact type power transmitting-receiving apparatus 200 according to an exemplary embodiment in the present disclosure illustrated in FIG. 2 may transmit the power to the power receiving apparatus 220 in the non-contact scheme and transmit the power between the power receiving apparatus 220 and the external electronic device 230 in the contact scheme to charge the power in the battery 222 in various schemes.

Figure 3:
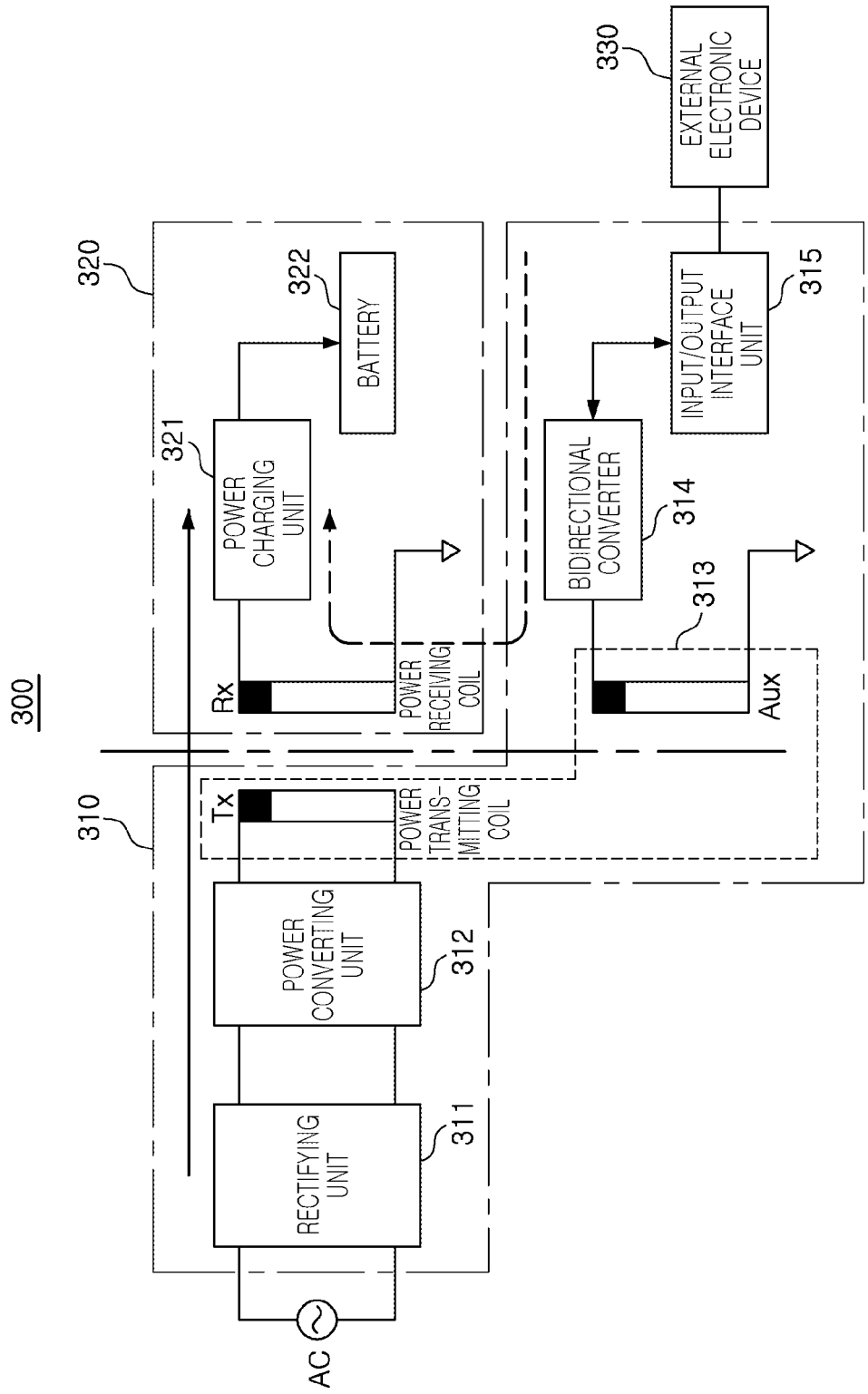
FIG. 3 is a view illustrating a schematic configuration of a contact/non-contact type power transmitting-receiving apparatus according to another exemplary embodiment in the present disclosure.

FIG. 3 is a view illustrating a schematic configuration of a contact/non-contact type power transmitting-receiving apparatus according to another exemplary embodiment in the present disclosure.

A power transmitting apparatus 310 illustrated in FIG. 3 may include a rectifying unit 311 and a power converting unit 312, similar to the power transmitting apparatuses 110 and 210 illustrated in FIGS. 1 and 2. As illustrated in FIG. 3, the power transmitting apparatus 310 may further include a transformer 313 having a power transmitting coil Tx and an auxiliary coil Aux, a bidirectional converter 314, and an input/output interface unit 315.

Similar to the descriptions provided with reference to FIGS. 1 and 2, the rectifying unit 311 may rectify input AC power, and the power converting unit 312 may convert the power rectified by the rectifying unit 311 into DC power, switch the converted DC power, and transmit the power externally therefrom through the power transmitting coil Tx in the non-contact scheme.

As described above, the power transmitting apparatus 310 illustrated in FIG. 3 may further include the transformer 313, the bidirectional converter 314, and the input/output interface unit 315, unlike the exemplary embodiments of the power transmitting apparatuses 110 and 210 illustrated in FIGS. 1 and 2.

The transformer 313 may have the power transmitting coil Tx and the auxiliary coil Aux, which may have a preset turns amount and may be magnetically coupled to each other to form a turns ratio therebetween.

Power applied to the power transmitting coil Tx may have a voltage level varied depending on the turns ratio and may be induced to the auxiliary coil Aux.

That is, the power applied to the power transmitting coil Tx may be transmitted to the power receiving coil Rx in the non-contact scheme and may be induced to the auxiliary coil Aux, the power induced to the auxiliary coil Aux may be transferred to the bidirectional converter 314, and the bidirectional converter 314 may transfer the power to the external electronic device 330 through the input/output interface unit 315.

The power receiving apparatus 320 illustrated in FIG. 3 may include a power receiving coil Rx, a power charging unit 321, and a battery 322, similar to the power receiving apparatuses 120 and 220 illustrated in FIGS. 1 and 2.

Similar to the descriptions provided with reference to FIGS. 1 and 2, the power receiving coil Rx may receive the power transmitted from the power transmitting coil Tx in the non-contact scheme, and the power charging unit 321 may convert the power received in the power receiving coil Rx into charging power and may charge the charging power in the battery 322.

In addition, although not shown, the power charging unit 321 may include a boost converter increasing a voltage level of the power received in the power receiving coil Rx or a buck converter decreasing a voltage level of the power received in the power receiving coil Rx.

The bidirectional converter 314 may transfer the power in two directions including one direction in which the power induced from the power transmitting coil Tx to the auxiliary coil Aux is transferred to the external electronic device 330 through the input/output interface unit 315 and the other direction in which the power of the external electronic device 330 is transferred to the power receiving coil Rx through the auxiliary coil Aux in the non-contact scheme.

Meanwhile, the AC power may not be input to the power transmitting apparatus 310 or the power may not be applied to the power transmitting coil Tx by an abnormal situation.

Therefore, when the power is induced from the power transmitting coil Tx to the auxiliary coil Aux, the bidirectional converter 314 may transfer the power from the auxiliary coil Aux to the external electronic device 330 through the input/output interface unit 315.

Meanwhile, when the AC power is not input to the power transmitting apparatus 310 or the power is not applied to the power transmitting coil Tx by the abnormal situation, as described above, such that the induction of the power from the power transmitting coil Tx to the auxiliary coil Aux stops, the bidirectional converter 314 may transmit the power of the external electronic device 330 to the power receiving coil Rx through the auxiliary coil Aux in the non-contact scheme.

Here, the bidirectional converter 314 may switch the power of the external electronic device 330, similar to the power converting unit 312 of the power transmitting apparatus 310, and transmit the switched power from the auxiliary coil Aux to the power receiving coil Rx in the non-contact scheme.

According to the above-mentioned description, the contact/non-contact type power transmitting-receiving apparatus 300 according to another exemplary embodiment in the present disclosure illustrated in FIG. 3 may transmit the power to the power receiving apparatus 320 in the non-contact scheme and transfer the power of the external electronic device 330 to the power receiving apparatus 320 in the non-contact scheme even in the case in which the AC power is not input to the power transmitting apparatus 310 or the power is not applied to the power transmitting coil Tx by the abnormal situation, such that the induction of the power from the power transmitting coil Tx to the auxiliary coil Aux stops, whereby the power may be stably charged in the battery.

As set forth above, according to exemplary embodiments of the present disclosure, a power converting operation may be simplified, such that power converting efficiency may be increased, and a circuit area and a product size may be decreased. In addition, the power may be transferred to the battery in the contact and non-contact schemes to thereby be charged in the battery.

While exemplary embodiments have been shown and described above, it will be apparent to those skilled in the art that modifications and variations could be made without departing from the scope of the present invention as defined by the appended claims.

What is claimed is:

1. A non-contact type power transmitting apparatus comprising:
   a rectifying unit rectifying alternating current (AC) power;
   a power converting unit converting the power rectified by the rectifying unit into direct current (DC) power through a single power converting operation and switching the DC power;
   a transformer having a power transmitting coil configured to transmit the power from the power converting unit externally in a non-contact scheme and an auxiliary coil magnetically coupled to the power transmitting coil configured to transfer power converted depending on a turns ratio to the power transmitting coil externally in a contact scheme; and
   a bidirectional converter configured to transfer power in two directions including one direction in which the power from the power transmitting coil is transferred to an external electronic device through an input/output interface unit and an other direction in which power of the external electronic device is transmitted externally in the non-contact scheme.

2. The non-contact type power transmitting apparatus of claim 1, wherein the bidirectional converter transfers the power from the power transmitting coil to the external electronic device through the input/output interface unit when the power from the power transmitting coil is transferred to the bidirectional converter, and transmits the power of the external electronic device externally through the auxiliary coil in the non-contact scheme when transfer of the power from the power transmitting coil stops.

3. A non-contact type power transmitting-receiving apparatus comprising:
   a power transmitting apparatus including a rectifying unit configured to rectify AC power, a power converting unit configured to convert the power rectified by the rectifying unit into DC power through a single power converting operation and switching the DC power, and a power transmitting coil configured to transmit the power from the power converting unit externally therefrom in a non-contact scheme; and
   a power receiving apparatus including a power receiving coil configured to receive the power transmitted from the power transmitting coil in the non-contact scheme, a power charging unit configured to convert the power received in the power receiving coil into charging power and to charge a battery with the charging power, and a bidirectional converter configured to bidirectionally transfer power between the battery and an external electronic device through an input/output interface unit in a contact scheme.

4. The non-contact type power transmitting-receiving apparatus of claim 3, wherein the power charging unit includes at least one of a buck converter and a boost converter varying a voltage level of the power received in the power receiving coil.

5. The non-contact type power transmitting-receiving apparatus of claim 3, wherein the bidirectional converter transfers the power charged in the battery to the external electronic device when a voltage level of the power charged in the battery is higher than that of power of the external electronic device, and transfers the power from the external electronic device to the battery when the voltage level of the power of the external electronic device is higher than that of the power charged in the battery.

6. A contact/non-contact type power transmitting-receiving apparatus comprising:
   a power transmitting apparatus including a rectifying unit configured to rectify AC power, a power converting unit configured to convert the power rectified by the rectifying unit into DC power through a single power converting operation and to switch the DC power, a transformer having a power transmitting coil configured to transmit the power from the power converting unit externally in a non-contact scheme and an auxiliary coil magnetically coupled to the power transmitting coil configured to transfer power converted depending on a turns ratio to the power transmitting coil externally therefrom in a contact scheme, and a bidirectional converter configured to transfer power in two directions including one direction in which power induced from the power transmitting coil to the auxiliary coil is transferred to an external electronic device through an input/output interface unit and an other direction in which power from the external electronic device is transmitted to the power receiving coil through the auxiliary coil in the non-contact scheme; and
   a power receiving apparatus including a power receiving coil configured to receive the power transmitted from the power transmitting coil in the non-contact scheme and a power charging unit configured to convert the power received in the power receiving coil into charging power and to charge a battery with the charging power.

7. The contact/non-contact type power transmitting-receiving apparatus of claim 6, wherein the bidirectional converter transfers the power from the auxiliary coil to the external electronic device through the input/output interface unit when the power is induced from the power transmitting coil to the auxiliary coil, and transmits the power of the external electronic device to the power receiving coil through the auxiliary coil in the non-contact scheme when induction of the power from the power transmitting coil to the auxiliary coil stops.

* * * * *